(12) United States Patent
Liu et al.

(10) Patent No.: US 12,293,775 B2
(45) Date of Patent: May 6, 2025

(54) VOICE CONTROL METHOD AND APPARATUS, CHIP, EARPHONES, AND SYSTEM

(71) Applicant: Shenzhen Goodix Technology Co., Ltd., Guangdong (CN)

(72) Inventors: Zhiyao Liu, Guangdong (CN); Shuqing Cheng, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 284 days.

(21) Appl. No.: 17/695,825

(22) Filed: Mar. 15, 2022

(65) Prior Publication Data

US 2022/0230657 A1 Jul. 21, 2022

Related U.S. Application Data

(63) Continuation of application No. PCT/CN2019/107044, filed on Sep. 20, 2019.

(51) Int. Cl.
*G10L 15/08* (2006.01)
*G10L 25/78* (2013.01)

(52) U.S. Cl.
CPC .............. *G10L 25/78* (2013.01); *G10L 15/08* (2013.01); *G10L 2015/088* (2013.01); *G10L 2025/783* (2013.01)

(58) Field of Classification Search
CPC ... G10L 25/78; G10L 15/08; G10L 2015/088; G10L 2025/783; G10L 15/32; G10L 17/00; G10L 2015/027; G10L 15/22
See application file for complete search history.

(56) References Cited

U.S. PATENT DOCUMENTS 10,027,662 B1 * 7/2018 Mutagi ............... H04L 63/0861
10,121,467 B1 * 11/2018 Gandhe ................. G06F 40/247
(Continued)

FOREIGN PATENT DOCUMENTS

CN   101826324 A   9/2010
CN   103177724 A   6/2013
(Continued)

OTHER PUBLICATIONS

Shenzhen Goodix Technology Co., Ltd., International Search Report with English Translation, PCT/CN2019/107044, Jun. 28, 2020, 8 pgs.
(Continued)

*Primary Examiner* — Abul K Azad
(74) *Attorney, Agent, or Firm* — Finnegan, Henderson, Farabow, Garrett & Dunner, LLP

(57) ABSTRACT

A voice control method and apparatus, a chip, earphones, and a system. The method includes: recognizing (001) whether a voice signal includes a keyword; in response to the voice signal including the keyword, executing (001a) an instruction corresponding to the keyword or sending the instruction; before recognizing whether the voice signal includes the keyword, determining (002) whether the voice signal is from a target user and, in response to the voice signal being from the target user, starting to recognize (001) whether the voice signal includes the keyword; or during recognizing whether the voice signal includes the keyword, determining (002) whether the voice signal is from the target user and, in response to the voice signal being from a non-target user, stopping recognizing (003a) whether the voice signal includes the keyword. The voice control method reduces the power consumption of voice control and improves the endurance.

20 Claims, 10 Drawing Sheets

(56) References Cited

U.S. PATENT DOCUMENTS

| | | | |
|---|---|---|---|
| 11,074,910 B2* | 7/2021 | Lee | G10L 21/0208 |
| 11,404,067 B2* | 8/2022 | Toma | H04N 21/4415 |
| 2012/0215537 A1 | 8/2012 | Igarashi | |
| 2014/0149118 A1 | 5/2014 | Lee et al. | |
| 2015/0222948 A1 | 8/2015 | Wang et al. | |
| 2018/0286414 A1* | 10/2018 | Ravindran | G10L 15/08 |
| 2018/0324518 A1* | 11/2018 | Dusan | G06F 3/167 |

FOREIGN PATENT DOCUMENTS

| | | | | |
|---|---|---|---|---|
| CN | 103559881 A | | 2/2014 | |
| CN | 104937603 A | * | 9/2015 | G06F 21/32 |
| CN | 105933765 A | | 9/2016 | |
| CN | 107464558 A | | 12/2017 | |
| CN | 107564523 A | | 1/2018 | |
| CN | 109671185 A | * | 4/2019 | G07C 9/37 |
| CN | 109754788 A | | 5/2019 | |
| CN | 110235087 A | | 9/2019 | |
| WO | 2018133307 A1 | | 7/2018 | |

OTHER PUBLICATIONS

Shenzhen Goodix Technology Co., Ltd., CN First Office Action with English translation, CN 2019800022213, Oct. 21, 2023, 15 pgs.

Shenzhen Goodix Technology Co., Ltd., The Second Office Action with English translation, CN 2019800022213, Mar. 16, 2024, 20 pgs.

* cited by examiner

VOICE CONTROL METHOD AND APPARATUS, CHIP, EARPHONES, AND SYSTEM

CROSS REFERENCE TO RELATED APPLICATIONS

The present application is a continuation of PCT Patent Application No. PCT/CN2019/107044, entitled "VOICE CONTROL METHOD AND APPARATUS, CHIP, EARPHONES, AND SYSTEM" filed on Sep. 20, 2019, which is incorporated by reference herein in its entirety.

TECHNICAL FIELD

The present disclosure relates to the field of voice processing, in particular to a voice control method and apparatus, a chip, earphones, and a system.

BACKGROUND

With the development of artificial intelligence, the function of controlling intelligent devices by voice has gradually become popular. For example, a user can wake up a Siri voice assistant of a mobile phone by saying "Hey Siri" when wearing earphones. The functional applications for controlling intelligent devices such as mobile phones and laptops through a voice control method are becoming more and more common. However, the realization of voice control based on a keyword recognition technology requires a lot of algorithmic operations, which leads to high power consumption, thus affecting the endurance capability of electronic products and resulting in poor user experience.

SUMMARY

Aiming at the problem that a voice control method in the existing technology lead to high power consumption, the present disclosure provides a voice control method and apparatus, a chip, earphones, and a system.

A first aspect of some embodiments of the present disclosure provides a voice control method, including:
  recognizing whether a voice signal includes a keyword;
  in response to the voice signal including the keyword, executing an instruction corresponding to the keyword or sending the instruction;
  determining whether the voice signal is from a target user before recognizing whether the voice signal includes the keyword, and in response to the voice signal being from the target user, starting to recognize whether the voice signal includes the keyword; or
  determining whether the voice signal is from the target user during recognizing whether the voice signal includes the keyword, and in response to the voice signal being from a non-target user, stopping recognizing whether the voice signal includes the keyword.

In addition, in combination with the first aspect, in an implementation of the first aspect, determining whether the voice signal is from the target user before recognizing whether the voice signal includes the keyword. In response to the voice signal being from the non-target user, determining whether a next frame of voice signal is from the target user.

In addition, in combination with the first aspect and the above-mentioned implementation, in another implementation of the first aspect, determining whether the voice signal is from the target user during recognizing whether the voice signal includes the keyword. In response to the voice signal being from the target user, continuing to recognize whether the voice signal includes the keyword.

In addition, in combination with the first aspect and the above-mentioned implementations, in another implementation of the first aspect, before determining whether the voice signal is from the target user, the method further includes detecting whether the voice signal exists, and in response to detecting that the voice signal exists, determining whether the voice signal is from the target user.

In addition, in combination with the first aspect and the above-mentioned implementations, in another implementation of the first aspect, before determining whether the voice signal is from the target user during recognizing whether the voice signal includes the keyword, detecting, before starting to recognize whether the voice signal comprises the keyword, whether the voice signal exists; and in response to the voice signal existing, starting to recognize whether the voice signal includes the keyword.

In addition, in combination with the first aspect and the above-mentioned implementations, in another implementation of the first aspect, the keyword includes N syllables, the N is an integer greater than or equal to 2. Recognizing whether the voice signal includes the keyword includes:
  recognizing sequentially whether the voice signal includes the N syllables according to a preset syllable order;
  recognizing whether the voice signal includes a (n+1)-th syllable in the preset syllable order after recognizing that the voice signal includes a n-th syllable in the preset syllable order, until recognition of the N syllables is completed, where the n is an integer greater than 0 and less than the N.

In addition, in combination with the first aspect and the above-mentioned implementations, in another implementation of the first aspect, stopping recognizing whether the voice signal includes the keyword includes:
  stopping recognizing whether the voice signal includes the keyword before recognizing whether the voice signal includes the (n+1)-th syllable; or
  stopping recognizing whether the voice signal includes the keyword during recognizing whether the voice signal includes the n-th syllable.

In addition, in combination with the first aspect and the above-mentioned implementations, in another implementation of the first aspect, recognizing whether the voice signal includes the keyword includes:
  performing m-th recognition of whether the voice signal includes the keyword using a m-th algorithm; and
  recognizing whether the voice signal includes the keyword using a (m+1)-th algorithm after recognizing that the voice signal includes the keyword using the m-th algorithm, until recognition of whether the voice signal includes the keyword is performed for M times;
  where the M is an integer greater than or equal to 2, a complexity of the m-th algorithm increases with an increase of m, where the m is an integer greater than 0 and smaller than the M.

In addition, in combination with the first aspect and the above-mentioned implementations, in another implementation of the first aspect, stopping recognizing whether the voice signal includes the keyword includes:
  stopping recognizing whether the voice signal includes the keyword before recognizing whether the voice signal includes the keyword using the (m+1)-th algorithm; or stopping recognizing whether the voice signal includes the keyword during recognizing whether the voice signal includes the keyword using the m-th algorithm.

In addition, in combination with the first aspect and the above-mentioned implementations, in another implementation of the first aspect, before recognizing whether the voice signal includes the keyword or before determining whether the voice signal is from the target user, the method further includes:

collecting the voice signal; and
caching the collected voice signal.

In addition, in combination with the first aspect and the above-mentioned implementations, in another implementation of the first aspect, collecting the voice signal includes:

one or both of collecting the voice signal by a vibration sensor and collecting the voice signal by a microphone.

In addition, in combination with the first aspect and the above-mentioned implementations, in another implementation of the first aspect, determining whether the voice signal is from the target user includes:

in response to an energy of the voice signal collected by the vibration sensor exceeding a threshold energy, determining that the voice signal is from the target user; or in response to the voice signal collected by the microphone meeting a preset condition of a voiceprint recognition, determining that the voice signal is from the target user In addition, in combination with the first aspect and the above-mentioned implementations, in another implementation of the first aspect, the collected voice signal is filtered before determining whether the voice signal is from the target user.

In addition, in combination with the first aspect and the above-mentioned implementations, in another implementation of the first aspect, detecting whether the voice signal exists when caching the collected voice signal. In response to the voice signal existing, starting to determine whether the voice signal is from the target user.

In addition, in combination with the first aspect and the above-mentioned implementations, in another implementation of the first aspect, the instruction includes one or more of waking up a voice assistant, adjusting a volume, adjusting a brightness, lighting up a screen, making a telephone call and playing music, etc.

A second aspect of some embodiments of the present disclosure provides a voice control apparatus, including:

a keyword recognition module, configured to recognize whether a voice signal includes a keyword;

a command module, connected with the keyword recognition module and configured to execute an instruction corresponding to the keyword or send the instruction in response to the keyword recognition module recognizing that the voice signal includes the keyword;

a determining module, connected with the keyword recognition module and configured to determine whether the voice signal is from a target user before the keyword recognition module recognizes whether the voice signal includes the keyword, and in response to the determining module determining that the voice signal is from the target user, the keyword recognition module starting to recognize whether the voice signal includes the keyword; or configured to determine whether the voice signal is from the target user during the keyword recognition module recognizing whether the voice signal includes the keyword, and in response to the determining module determining that the voice signal is from a non-target user, the keyword recognition module stopping recognizing whether the voice signal includes the keyword.

In addition, in combination with the second aspect, in an implementation of the second aspect, before the keyword recognition module recognizes whether the voice signal includes the keyword, the determining module is configured to determine whether the voice signal is from the target user. In response to the determining module determining that the voice signal is from the non-target user, the determining module is configured to determine whether a next frame of voice signal is from the target user.

In addition, in combination with the second aspect and the above-mentioned implementation, in another implementation of the second aspect, during the keyword recognition module recognizing whether the voice signal includes the keyword, the determining module is configured to determine whether the voice signal is from the target user. In response to the determining module determining that the voice signal is from the target user, the keyword recognition module continues to recognize whether the voice signal includes the keyword.

In addition, in combination with the second aspect and the above-mentioned implementations, in another implementation of the second aspect, the apparatus further includes a voice activity detection module configured to detect whether the voice signal exists before the determining module determines whether the voice signal is from the target user. In response to the voice activity detection module detecting that the voice signal exists, the determining module determines whether the voice signal is from the target user.

In addition, in combination with the second aspect and the above-mentioned implementations, in another implementation of the second aspect, before the determining module determines whether the voice signal is from the target user during the keyword recognition module recognizing whether the voice signal includes the keyword, the voice activity detection module detects whether the voice signal exists before the keyword recognition module starts to recognize whether the voice signal includes the keyword; and in response to the voice activity detection module detecting that the voice signal exists, the keyword recognition module starts to recognize whether the voice signal includes the keyword.

In addition, in combination with the second aspect and the above-mentioned implementations, in another implementation of the second aspect, the keyword includes N syllables, the N is an integer greater than or equal to 2; and the keyword recognition module includes:

a syllable recognition module, configured to sequentially recognize whether the voice signal includes the N syllables according to a preset syllable order;

after recognizing that the voice signal includes a n-th syllable in the preset syllable order, the syllable recognition module recognizes whether the voice signal includes a (n+1)-th syllable in the preset syllable order, until recognition of the N syllables is completed, where the n is an integer greater than 0 and less than the N.

In addition, in combination with the second aspect and the above-mentioned implementations, in another implementation of the second aspect, the keyword recognition module stops recognizing whether the voice signal includes the keyword before the syllable recognition module recognizes whether the voice signal includes the (n+1)-th syllable; or the keyword recognition module stops recognizing whether the voice signal includes the keyword during the syllable recognition module recognizing whether the voice signal includes the n-th syllable.

In addition, in combination with the second aspect and the above-mentioned implementations, in another implementation of the second aspect, the keyword recognition module includes:
- a hierarchical recognition module, configured to perform m-th recognition of whether the voice signal includes the keyword using a m-th algorithm;
- after recognizing that the voice signal includes the keyword using the m-th algorithm, the hierarchical recognition module recognizes whether the voice signal includes the keyword using a (m+1)-th algorithm, until recognition of whether the voice signal includes the keyword is performed for M times;
- where the M is an integer greater than or equal to 2, a complexity of the m-th algorithm increases with an increase of m, where the m is an integer greater than 0 and smaller than the M.

In addition, in combination with the second aspect and the above-mentioned implementations, in another implementation of the second aspect, the keyword recognition module stops recognizing whether the voice signal includes the keyword before the hierarchical recognition module recognizes whether the voice signal includes the keyword using the (m+1)-th algorithm; or the keyword recognition module stops recognizing whether the voice signal includes the keyword during the hierarchical recognition module recognizing whether the voice signal includes the keyword using the m-th algorithm.

In addition, in combination with the second aspect and the above-mentioned implementations, in another implementation of the second aspect, the apparatus further includes:
- a collecting module, configured to collect the voice signal; and
- a cache module, configured to cache the collected voice signal before the keyword recognition module recognizes whether the voice signal includes the keyword or before the determining module determines whether the voice signal is from the target user.

In addition, in combination with the second aspect and the above-mentioned implementations, in another implementation of the second aspect, the collecting module includes one or both of a vibration sensor module and a microphone module;
- the vibration sensor module is configured to collect the voice signal using a vibration sensor; and
- the microphone module is configured to collect the voice signal using a microphone.

In addition, in combination with the second aspect and the above-mentioned implementations, in another implementation of the second aspect, the determining module includes:
- an energy determining module, configured to determine that the voice signal is from the target user in response to an energy of the voice signal collected by the vibration sensor module exceeding a threshold energy; or
- a voiceprint recognition module, configured to determine that that voice signal is from the target user in response to the voice signal collected by the microphone module meeting a preset condition of voiceprint recognition In addition, in combination with the second aspect and the above-mentioned implementations, in another implementation of the second aspect, the apparatus further includes a filtering module configured to filter the voice signal collected by the collecting module before the determining module determines whether the voice signal is from the target user.

In addition, in combination with the second aspect and the above-mentioned implementations, in another implementation of the second aspect, when the cache module caches the voice signal, the voice activity detection module detects whether the voice signal exists. In response to the voice activity detection module detecting that the voice signal exists, the determining module starts to determine whether the voice signal is from the target user.

A third aspect of some embodiments of the present disclosure provides a chip that executes the voice control method described in the first aspect above.

A fourth aspect of some embodiments of the present disclosure provides an earphone including the chip described in the third aspect.

A fifth aspect of some embodiments of the present disclosure provides a voice control system that executes the voice control method described in the first aspect above.

Compared with the existing technology, the embodiments of the present disclosure have the beneficial effects as follows. Some embodiments of the present disclosure provide a voice control method and apparatus, a chip, earphones and a system. By determining whether the voice signal is from the target user before starting to recognize whether the voice signal includes the keyword; or by determining whether the voice signal is from the target user during recognizing whether the voice signal includes the keyword, the recognition of whether the voice signal includes the keyword is stopped in response to the voice signal being from the non-target user. In this way, the power consumption of the voice control method can be reduced and the endurance can be improved.

BRIEF DESCRIPTION OF THE DRAWINGS

In order to illustrate the technical solution in the embodiments of the present disclosure or in the existing technologies more clearly, the accompanying drawings used in the description of the embodiments or the existing technologies are briefly described below. It is apparent that the drawings described below are only some embodiments of the present disclosure. For those skilled in the art, other drawings may be obtained in accordance with these drawings without any creative work.

DETAILED DESCRIPTION

In order to make the objectives, technical solutions and advantages of the present disclosure clearer, some embodiments of the present disclosure will be described in detail below by way of examples with reference to the accompanying drawings. However, it will be apparent to those skilled in the art that, in each example, numerous technical details are set forth in order to provide the reader with a better understanding of the present disclosure. However, the technical solutions claimed in the present disclosure can be implemented without these technical details and various changes and modifications based on the following embodiments.

Figure 1:
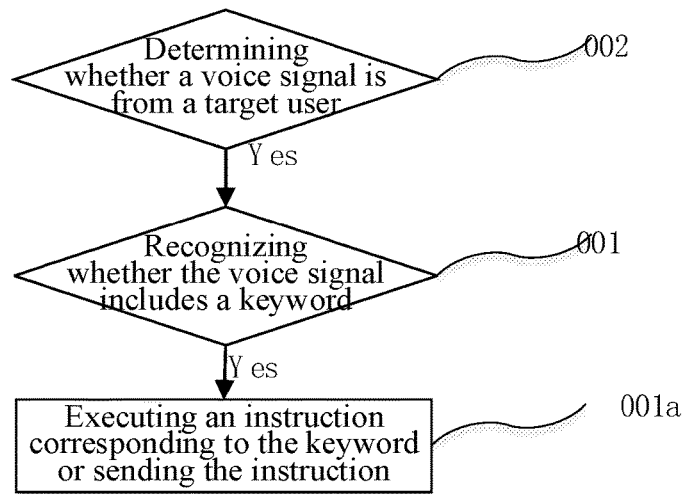
FIG. 1 is a flowchart of a voice control method according to an embodiment of the present disclosure.

Some embodiments of the present disclosure provide a voice control method, which can be applied to electronic products with a voice control function, for example, wearable devices such as earphones and smart glasses, or non-wearable devices such as a smart speaker, a sweeping robot, a computer, a mobile phone, etc. FIG. 1 is a flowchart of a voice control method according to an embodiment of the present disclosure. The voice control method according to the embodiment of the present disclosure includes the following operations.

In operation 001, whether a voice signal includes a keyword is recognized.

In operation 001, the voice signal is collected by an electronic device. The voice signal may be collected by a microphone or a vibration sensor. For wearable devices such as earphones, necklaces, helmets and smart glasses that may physically contact with a skull after wearing, the voice signal may be collected through a bone conduction path, or a variety of collection methods of the voice signal may be used at the same time. This embodiment does not limit the collection methods of the voice signal.

In response to the voice signal including the keyword, operation 001a of executing an instruction corresponding to the keyword or sending the instruction is executed.

Before operation 001, operation 002 of determining whether the voice signal is from a target user is executed.

Operation 002 is executed before starting to recognize whether the voice signal includes the keyword. In response to the voice signal being from the target user, recognition of whether the voice signal includes the keyword is started. Therefore, operation 001 is not executed until it is determined that the voice signal is from the target user, so as to avoid the mistaken execution or mistaken sending of an instruction corresponding to a keyword of a non-target user after the keyword being recognized. In addition, a keyword recognition operation of recognizing whether the voice signal includes the keyword consumes high power. Compared with determining whether the voice signal is from the target user after the keyword is recognized, the power consumption can be reduced by determining whether the voice signal is from the target user before the keyword is recognized. In this embodiment, the target user may be set by the user. Data of the target user set by the user may be stored in the electronic device for the electronic device to access at any time. It should be noted that the voice control method in this embodiment does not limit the number of electronic devices. Taking a mobile phone and an earphone as examples, the voice signal may be collected on the earphone. The voice signal collected on the earphone may be transmitted to the mobile phone to execute a keyword recognition by the mobile phone. The data of the target user may be stored in the mobile phone. The keyword recognition is executed on the mobile phone end to reduce the power consumption of the earphone. In addition, in response to the earphone having enough computing and storage capacity, the data of the target user may also be stored in the earphone, and the keyword recognition may also be executed by the earphone. In response to the voice signal including the keyword, the earphone sends the instruction corresponding to the keyword to the mobile phone, so as to realize a voice control of the mobile phone. Take a separate mobile phone as an example, the mobile phone may collect the voice signal, and the data of the target user is stored in the mobile phone for the keyword recognition. In response to the voice signal including the keyword, the mobile phone executes the instruction corresponding to the keyword. It should be noted that the voice control method may be applied to the same device, or may be applied to two or more devices with or without physical connection. A wearer may be set as the target user, or a non-wearer may be set as the target user. One or more target users may be set, which is not limited in this embodiment. The target user may be a user who has registered user data in the device, and the non-target user is a user other than the target user, for example, a stranger. One or more keyword may be set, which is also not limited in this embodiment.

Figure 2:
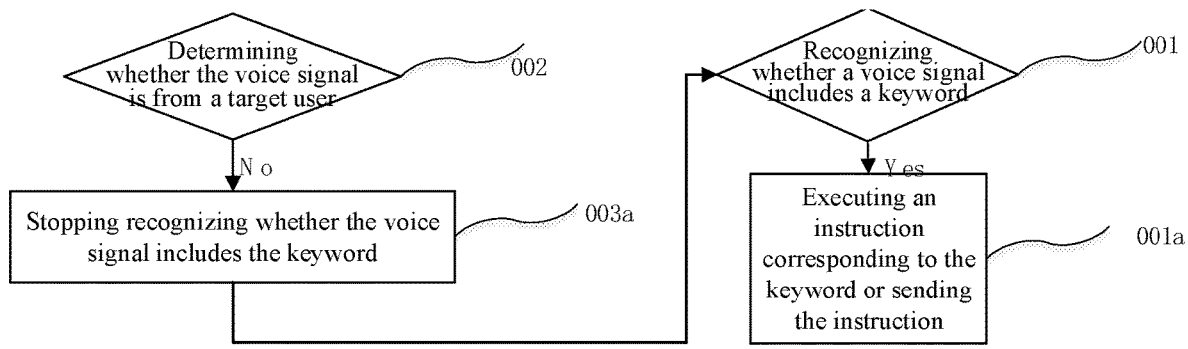
FIG. 2 is a flowchart of another voice control method according to an embodiment of the present disclosure.

Alternatively, operation 002 is executed in the process of executing operation 001. FIG. 2 is a flowchart of another voice control method according to an embodiment of the present disclosure. During recognizing whether the voice signal includes the keyword, it is determined whether the voice signal is from the target user. In FIG. 2, when determining whether the voice signal is from the target user, whether the voice signal includes the keyword is recognized. In response to the voice signal being from the non-target user, operation 003a of stopping recognizing whether the voice signal includes the keyword is executed. The operation 003a may control the operation 001 to stop. During recognizing whether the voice signal includes the keyword, it is determined whether the voice signal is from the target user. In response to the voice signal being from the non-target user, recognition of whether the voice signal includes the keyword may be stopped. The process of the keyword recognition is adjusted by a feedback based on the result of determining whether the voice signal is from the target user. Once it is detected that the voice signal is from the non-target user, the keyword recognition is stopped during the keyword recognition, and it is not necessary to complete the whole keyword recognition. In this way, the power consumption can be reduced.

The embodiments of the present disclosure provide a voice control method. According to the voice control method, the power consumption of the voice control can be reduced and the endurance can be improved by: determining whether the voice signal is from the target user before starting to recognize whether the voice signal includes the keyword, or determining whether the voice signal is from the target user during recognition of whether the voice signal includes the keyword, and in response to the voice signal being from the non-target user, recognition of whether the voice signal includes the keyword is stopped.

Figure 3:
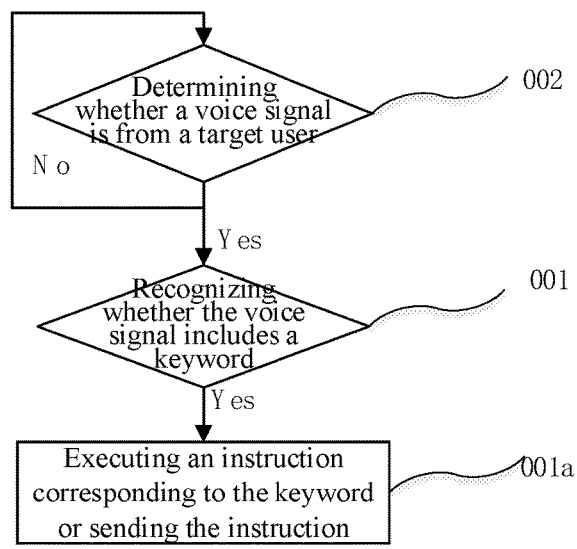
FIG. 3 is a flowchart of yet another voice control method according to an embodiment of the present disclosure.

Based on the disclosure of the above embodiments, in this embodiment, FIG. 3 is a flowchart of yet another voice control method provided by the embodiments of the present disclosure. Referring to FIG. 3, whether the voice signal is from the target user is determined before recognizing whether the voice signal includes the keyword. In response to the voice signal being from the non-target user, it is determined whether a next frame of voice signal is from the target user. In response to the voice signal being from the non-target user, instead of starting to recognize whether the voice signal includes the keyword, whether the next frame of the voice signal is from the target user is determined, so that only in response to the voice signal being from the target user, the keyword recognition is started. In this way, the power consumption of the voice control can be further reduced and the endurance of the electronic device can be further improved.

Figure 4:
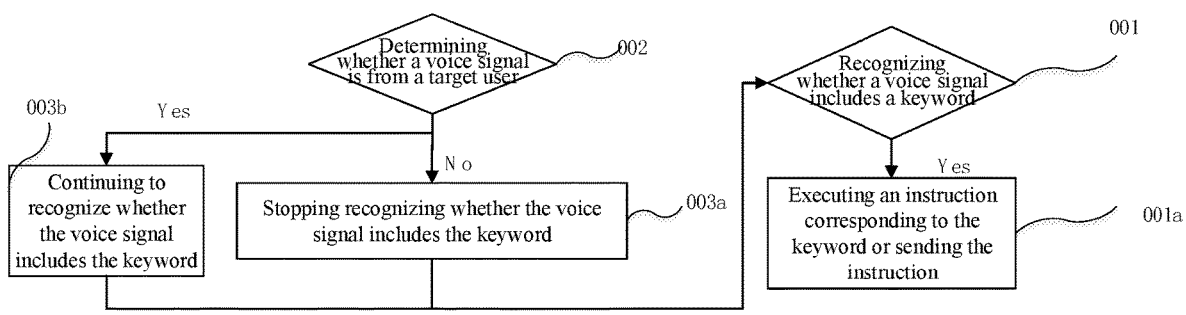
FIG. 4 is a flowchart of yet another voice control method according to an embodiment of the present disclosure.

Based on the disclosure in the above embodiments, in this embodiment, FIG. 4 is a flowchart of yet another voice control method provided by the embodiment of the present disclosure. Referring to FIG. 4, during recognizing whether the voice signal includes the keyword, whether the voice signal is from the target user is determined. That is, when determining whether the voice signal is from the target user, it is also recognized whether the voice signal includes the keyword. In response to the voice signal being from the target user, operation 003b of continuing to recognize whether the voice signal includes the keyword is executed. In this way, the process of the keyword recognition can be not affected. A keyword recognition module continues to perform the keyword recognition, until it is determined whether the voice signal includes the keyword. In this embodiment, operation 003b may not provide a feedback to operation 001, that is, only in response to the voice signal being from the non-target user, 003a is fed back to 001. In response to the voice signal being from the target user, 003b may provide no feedback, so as not to interfere with the process of 001. In response to the voice signal including the keyword, the instruction corresponding to the keyword is executed or the instruction is sent. In response to the voice signal not including the keyword, the instruction corresponding to the keyword is not executed or the instruction is not sent. Operation 003a may control operation 001 to stop.

In response to the voice signal being from the non-target user, the operation 001 is controlled to be stopped.

Figure 5:
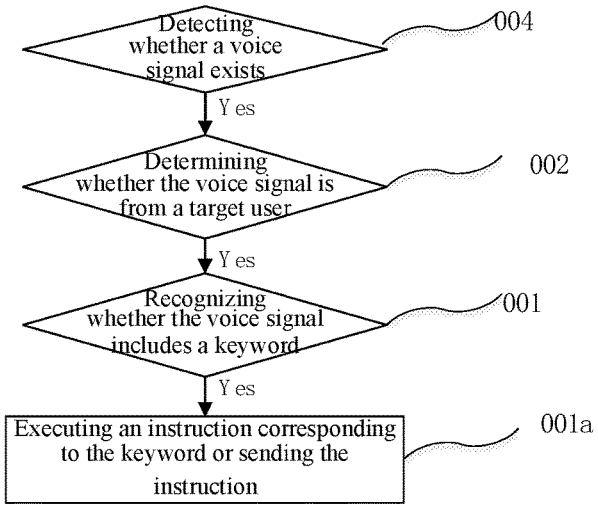
FIG. 5 is a flowchart of yet another voice control method according to an embodiment of the present disclosure.
Figure 6:
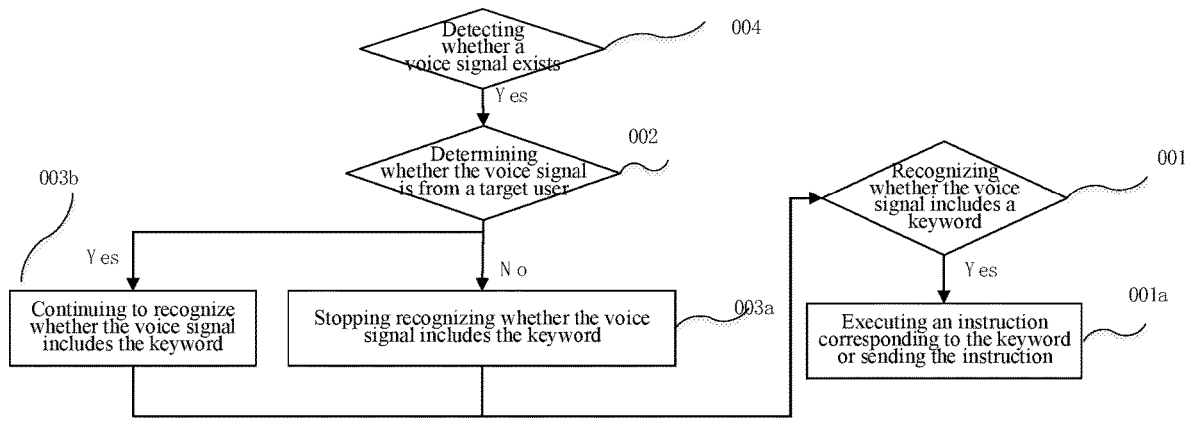
FIG. 6 is a flowchart of yet another voice control method according to an embodiment of the present disclosure.

Based on the disclosure in the above embodiments, FIGS. 5 and 6 are the flowcharts of yet another voice control method provided by the embodiment of the present disclosure. Referring to FIGS. 5 and 6, before determining whether the voice signal is from the target user, operation 004 of detecting whether the voice signal exists may be executed. In response to detecting that the voice signal exists, whether the voice signal is from the target user is determined. A voice activity detection technology may be used to determine whether the voice signal exists. The voice activity detection technology is configured to distinguish whether the collected signal is noise or a voice signal of the user. In response to someone's voice activity being detected, that is, it is detected that the voice signal of the target user or the non-target user exists, then whether the voice signal is from the target user is determined. Whether the voice signal exists may be continuously detected, until the voice signal is detected, and then whether the voice signal is from the target user is determined. Whether the voice signal exists may also be detected at intervals to further reduce the power consumption.

Figure 7:
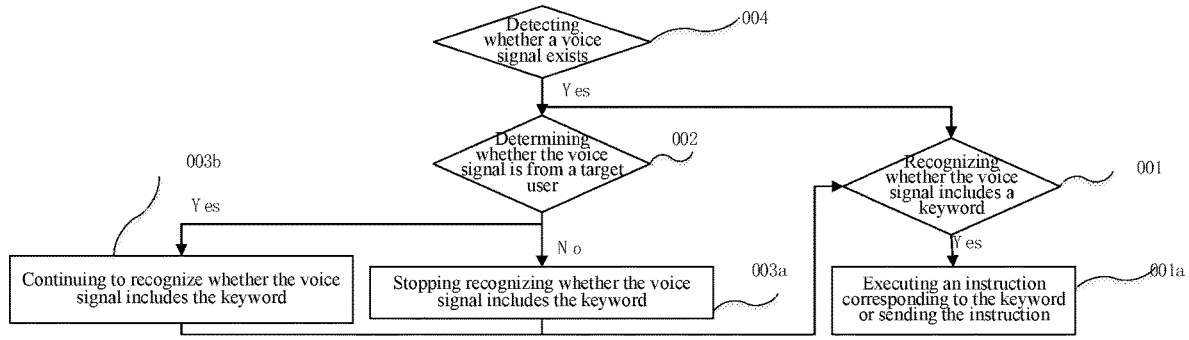
FIG. 7 is a flowchart of yet another voice control method according to an embodiment of the present disclosure.

Based on the disclosure in the above embodiments, FIG. 7 is a flowchart of yet another voice control method provided by the embodiment of the present disclosure. Referring to FIG. 7, before determining whether the voice signal is from the target user during recognizing whether the voice signal includes the keyword, operation 004 of detecting whether the voice signal exists may be executed before starting to recognize whether the voice signal includes the keyword, that is, before operation 001 is executed. In response to the voice signal existing, whether the voice signal includes the keyword is recognized. In response to no voice signal existing, 001 is not executed. In this embodiment, only in response to detecting that the voice signal exists, the keyword recognition and determination of whether the voice signal is from the target user are started. In this embodiment, the keyword recognition and determination of whether the voice signal is from the target user are carried out simultaneously.

Based on the disclosure in the above embodiments, in this embodiment, the keyword includes N syllables. The N is an integer greater than or equal to 2. Recognizing whether the voice signal includes the keyword includes the following operations.

Whether the voice signal includes the N syllables is sequentially recognized according to a preset syllable order.

Whether the voice signal includes a (n+1)-th syllable in the preset syllable order is recognized after recognizing that the voice signal includes a n-th syllable in the preset syllable order, until recognition of the N syllables is completed. The n is an integer greater than 0 and less than the N.

In this embodiment, starting from the recognition of a first syllable, the keyword recognition may be executed according to the following method.

Whether the voice signal includes the first syllable of the keyword is recognized.

In response to the voice signal including the first syllable, whether the voice signal includes a second syllable of the keyword is recognized.

In response to the voice signal including the n-th syllable, whether the voice signal includes the (n+1)-th syllable of the keyword is recognized, until the recognition of the N-th syllable is completed.

Figure 8:
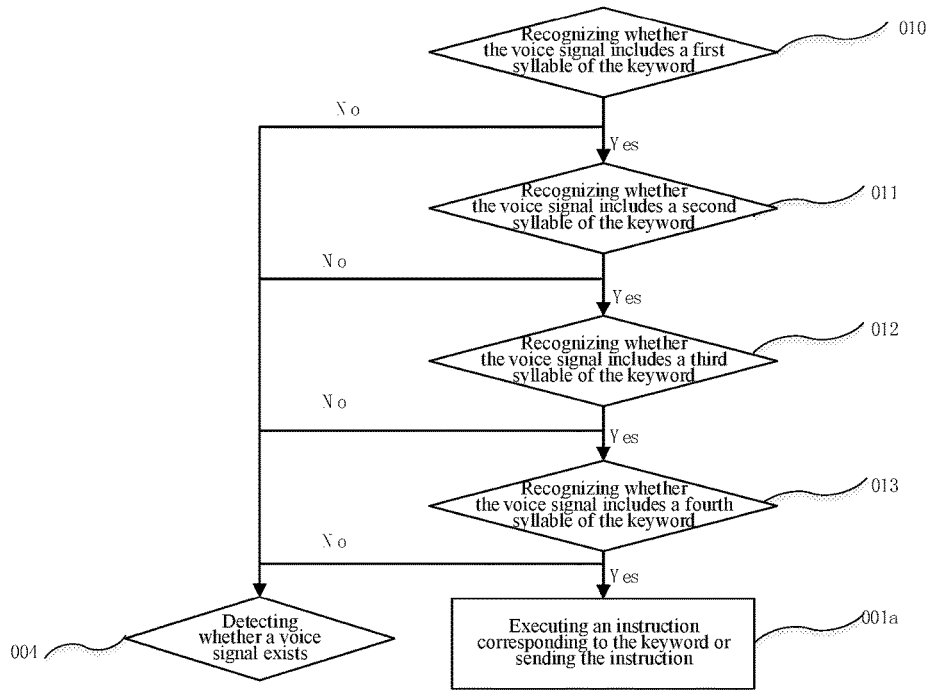
FIG. 8 is a flowchart of a method for recognizing whether a voice signal includes a keyword according to an embodiment of the present disclosure.

Referring to FIG. 8, this embodiment is described by taking the keyword including 4 syllables as an example.

Recognizing whether the voice signal includes the keyword includes the following operations.

In operation 010, whether the voice signal includes a first syllable of the keyword is recognized.

In response to the voice signal including the first syllable, operation 011 of recognizing whether the voice signal includes a second syllable of the keyword is executed.

In response to the voice signal including the second syllable, then operation 012 of recognizing whether the voice signal includes a third syllable of the keyword is executed.

In response to the voice signal including the third syllable, then operation 013 of recognizing whether the voice signal includes a fourth syllable of the keyword is executed. At this point, a recognition of the fourth syllable of the keyword is completed.

During recognizing whether the voice signal includes the N-th syllable of the keyword, in response to recognizing that the voice signal does not include any n-th syllable, it is not necessary to recognize the subsequent syllables, so as to reduce power consumption. In response to recognizing that the voice signal does not include any n-th syllable, return to operation 004 and whether the voice signal exists is continued to be detected. In response to detecting that a next frame of the voice signal exists, it is determined whether to execute the instruction corresponding to the keyword or to send the instruction based on the disclosure in the above embodiments.

A keyword "Hey SiRi" is taken as an example, which may be divided into three syllables, "Hey", "Si" and "Ri", and these three syllables are recognized one by one. The power consumption required for recognition of each syllable may be calculated according to the duration of the each syllable. The power consumption of each hierarchy may be approximate, depending on the duration of each syllable. In response to recognizing that the voice signal does not include the first syllable, it is not necessary to recognize the next two syllables, so as to reduce the power consumption.

Based on the disclosure in the above embodiments, in this embodiment, stopping recognizing whether the voice signal includes the keyword includes:

stopping recognizing whether the voice signal includes the keyword before recognizing whether the voice signal includes the (n+1)-th syllable of the keyword; or stopping recognizing whether the voice signal includes the keyword during recognizing whether the voice signal includes the n-th syllable of the keyword.

Figure 9:
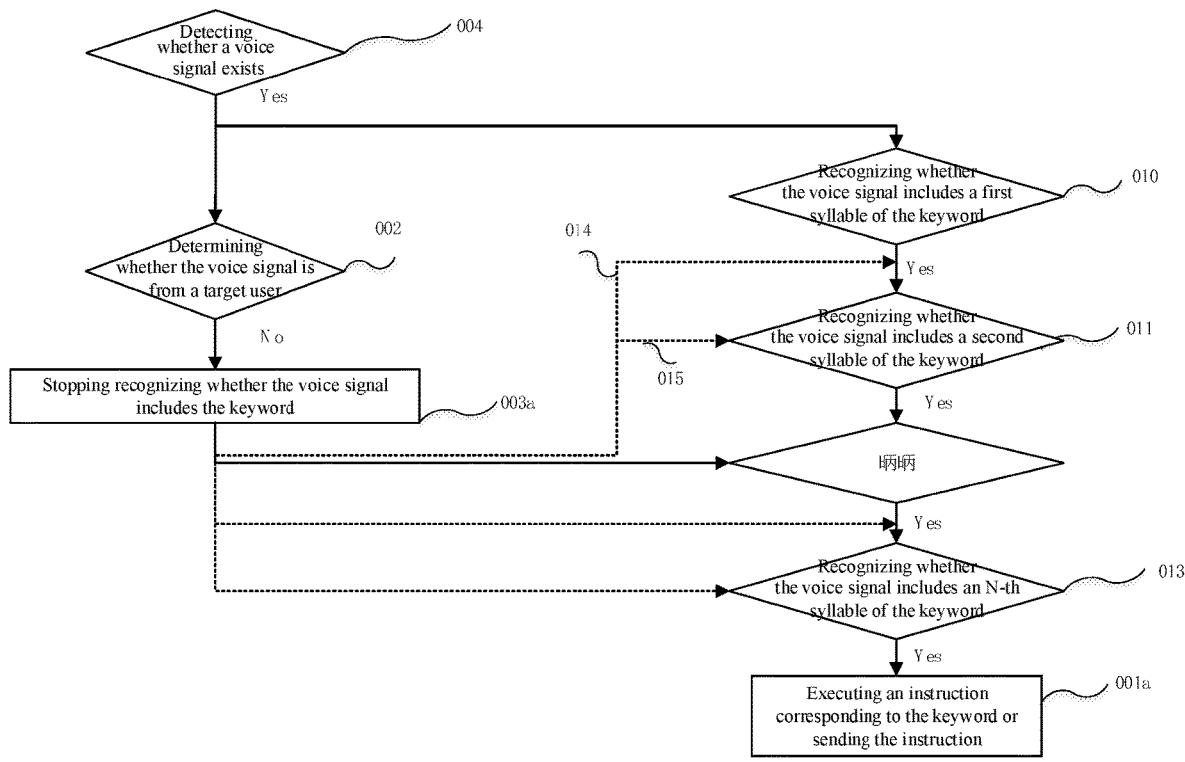
FIG. 9 is a flowchart of a method for stopping recognizing whether a voice signal includes a keyword according to an embodiment of the present disclosure.

Referring to FIG. 9, during recognizing whether the voice signal includes the keyword, whether the voice signal is from the target user is determined. In response to the voice signal being from the non-target user, recognizing whether the voice signal includes the keyword is stopped. Recognizing whether the voice signal includes the keyword may be stopped during recognizing whether the voice signal includes the first syllable, or during recognizing whether the voice signal includes the second syllable. In FIG. 9, operation 003a represents stopping recognizing whether the voice signal includes the keyword. If operation 011 is being executed at this time, operation 011 is stopped. Operations 014 and 015 represent transmitting an instruction of stopping recognizing whether the voice signal includes the keyword. In operation 014, in response to the stopping instruction being received before recognizing whether the voice signal includes the second syllable of the keyword, the keyword recognition is stopped before recognizing whether the voice signal includes the second syllable of the keyword. In operation 015, in response to the stopping instruction being received during recognizing whether the voice signal includes the second syllable of the keyword, the keyword recognition is stopped during recognizing whether the voice signal includes the second syllable of the keyword. All subsequent syllables are not recognized, and the instruction corresponding to the keyword are not executed or sent. Therefore, whether to execute the instruction corresponding to the keyword or to send the instruction corresponding to the keyword can be determined without executing the entire keyword recognition, which can reduce the power consumption. After stopping the keyword recognition, whether the voice signal exists may continue to be detected. In response to detecting that the next frame of voice signal exists, whether to execute the instruction corresponding to the keyword or to send the instruction corresponding to the keyword is determined based on the disclosure in the above embodiments. The moment of stopping recognizing whether the voice signal includes the keyword as shown in FIG. 9 is only an exemplary illustration. Whether the voice signal is from the target user is determined. In response to the voice signal being from the non-target user, the keyword recognition is stopped.

The keyword recognition may be stopped before or during recognizing whether the voice signal includes any syllable of the keyword. For example, in response to the operation of determining whether the voice signal is from the target user taking a short time and determining that the voice signal is from the non-target user, a feedback of stopping the keyword recognition may be received during recognizing whether the voice signal includes the first syllable of the keyword. Therefore, the keyword recognition is stopped during recognizing whether the voice signal includes the first syllable of the keyword. In response to the operation of determining whether the voice signal is from the target user taking a long time, and determining that the voice signal is from the non-target user, the feedback of stopping the keyword recognition may be received before or during recognizing whether the voice signal includes the 2nd, 3rd . . . N-th syllables of the keyword. Therefore, the keyword recognition is stopped before or during recognizing whether the voice signal includes the 2nd, 3rd . . . N-th syllables of the keyword.

Based on the disclosure in the above embodiments, in this embodiment, recognizing whether the voice signal includes the keyword includes the following operations.

Performing m-th recognition of whether the voice signal includes the keyword using a m-th algorithm.

After recognizing that the voice signal includes the keyword using the m-th algorithm, whether the voice signal includes the keyword is recognized using a (m+1)-th algorithm, until recognition of whether the voice signal includes the keyword is performed for M times. The M is an integer greater than or equal to 2. A complexity of the m-th algorithm increases with an increase of m. The m is an integer greater than 0 and smaller than the M.

In this embodiment, starting from using a first algorithm, the keyword recognition may be executed as follows.

Whether the voice signal includes the keyword is recognized using the first algorithm.

In response to recognizing that the voice signal includes the keyword using the first algorithm, whether the voice signal includes the keyword is recognized by using a second algorithm.

In response to recognizing that the voice signal includes the keyword using the m-th algorithm, whether the voice signal includes the keyword is recognized using the (m+1)- th algorithm, until recognition of whether the voice signal includes the keyword using the M-th algorithm is completed.

Figure 10:
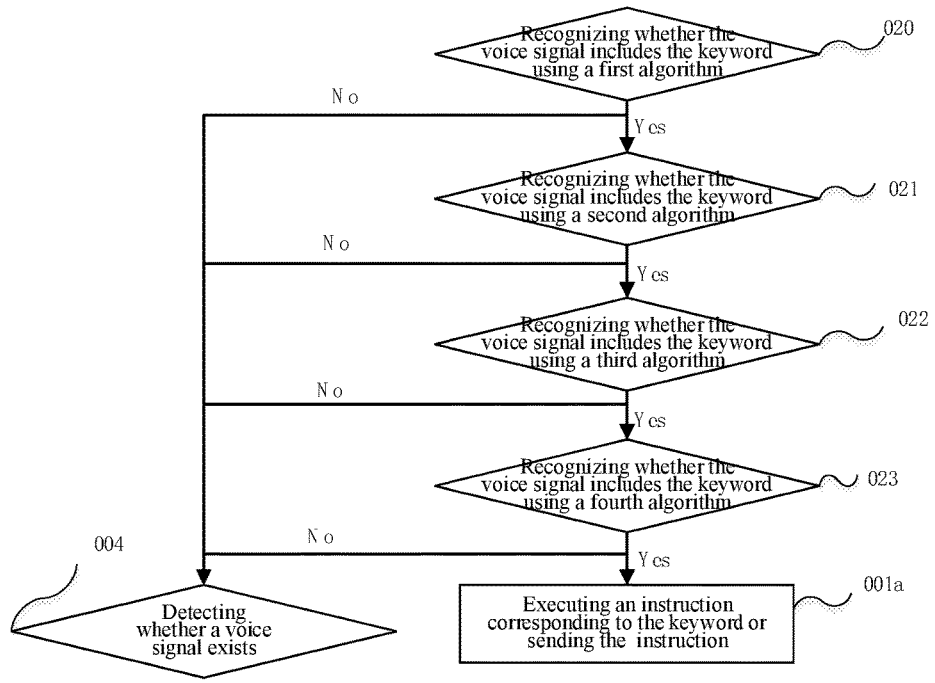
FIG. 10 is a flowchart of another method for recognizing whether a voice signal includes a keyword according to an embodiment of the present disclosure.

Referring to FIG. 10, taking M equal to 4 as an example for description, that is, four times of recognition of whether the voice signal includes the keyword is performed. Recognizing whether the voice signal includes the keyword includes the following operations.

In operation 020, whether the voice signal includes the keyword is recognized using a first algorithm.

In response to recognizing that the voice signal includes the keyword using the first algorithm, operation 021 of recognizing whether the voice signal includes the keyword using a second algorithm is executed.

In response to recognizing that the voice signal includes the keyword using the second algorithm, operation 022 of recognizing whether the voice signal includes the keyword using a third algorithm is executed.

In response to recognizing that the voice signal includes the keyword using the third algorithm, operation 023 of recognizing whether the voice signal includes the keyword using a fourth algorithm is executed. So far, recognition of whether the voice signal includes the keyword using the fourth algorithm is completed.

In this embodiment, in response to recognizing that the voice signal does not include the keyword using the m-th algorithm, it is not necessary to continue to use the (m+1)-th algorithm to recognize whether the voice signal includes the keyword, so as to reduce power consumption. In response to recognizing that the voice signal does not include the keyword using the m-th algorithm, return to the operation 004 and whether the voice signal exists is continued to be detected. In response to detecting that the next frame of the voice signal exists, whether to execute the instruction corresponding to the keyword or to send the instruction corresponding to the keyword is determined based on the disclosure in the above embodiments. The complexity of the m-th algorithm increases with the increase of m. Therefore, the power consumption of the preceding-hierarchy algorithm is less than the power consumption of the later-hierarchy algorithm. The higher the complexity of the algorithm used for the keyword recognition, the higher the accuracy of the keyword recognition and the greater the power consumption. In response to a rough recognition recognizing that the voice signal includes the keyword using a preceding-hierarchy algorithm, the next hierarchy of algorithm may be used for a more accurate recognition. In this way, the power consumption can be further reduced.

Based on the disclosure in the above embodiments, in this embodiment, stopping recognizing whether the voice signal includes the keyword includes:

stopping recognizing whether the voice signal includes the keyword before recognizing whether the voice signal includes the keyword using the (m+1)-th algorithm; or stopping recognizing whether the voice signal includes the keyword during recognizing whether the voice signal includes the keyword using the m-th algorithm.

Figure 11:
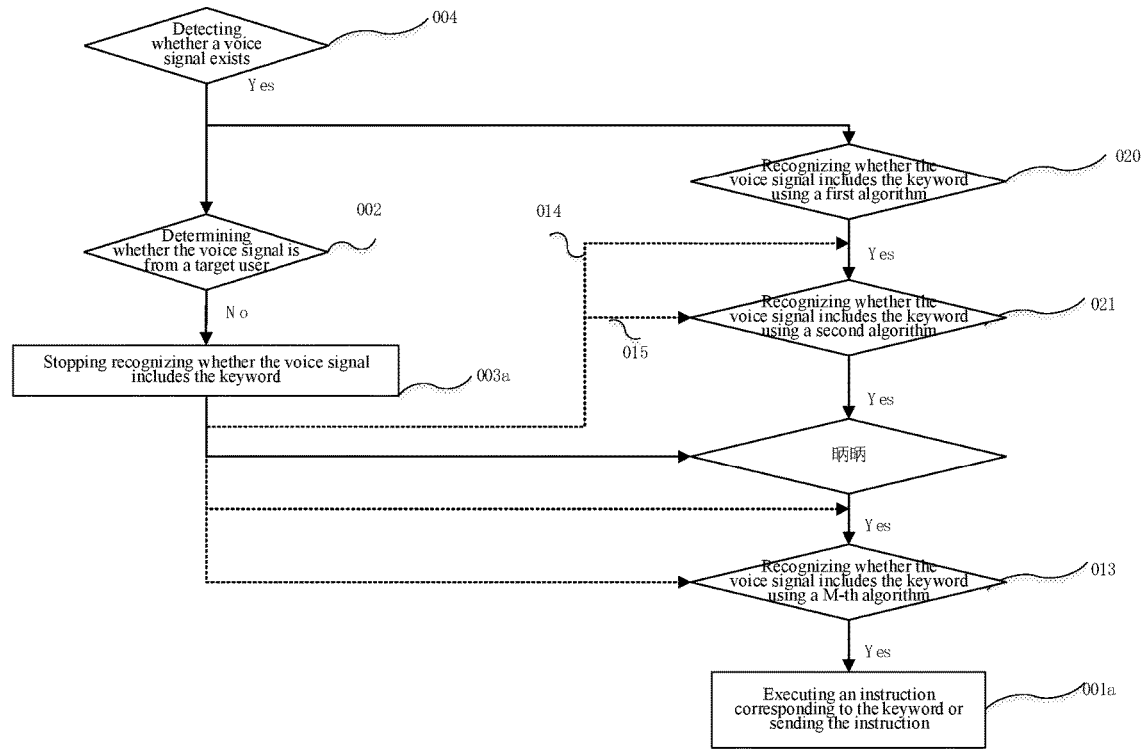
FIG. 11 is a flowchart of another method for stopping recognizing whether a voice signal includes a keyword according to an embodiment of the present disclosure.

Referring to FIG. 11, during recognizing whether the voice signal includes the keyword, whether the voice signal is from the target user is determined. In response to the voice signal being from the non-target user, recognition of whether the voice signal includes the keyword is stopped. Recognition of whether the voice signal includes the keyword may be stopped during recognizing whether the voice signal includes the keyword using the first algorithm, or may be stopped during recognizing whether the voice signal includes the keyword using the second algorithm. In FIG. 11, operation 003a represents stopping recognizing whether the voice signal includes the keyword. If operation 021 is being executed at this time, operation 021 is stopped. Operations 014 and 015 represent transmitting an instruction of stopping recognizing whether the voice signal includes the keyword. In operation 014 in FIG. 11, in response to the stopping instruction being received before recognizing whether the voice signal includes the keyword using the second algorithm, the keyword recognition is stopped before recognizing whether the voice signal includes the keyword using the second algorithm. In operation 015 in FIG. 11, in response to the stopping instruction being received during recognizing whether the voice signal includes the keyword using the second algorithm, the keyword recognition is stopped during recognizing whether the voice signal includes the keyword using the second algorithm. After stopping the keyword recognition, the recognition process of a later-stage keyword is not executed, and the instruction corresponding to the keyword are not executed or sent. Therefore, whether to execute the instruction corresponding to the keyword or to send the instruction corresponding to the keyword may be determined without executing the entire keyword recognition. In this way, the power consumption can be reduced. After stopping the keyword recognition, whether the voice signal exists may be detected. In response to detecting that the next frame of voice signal exists, whether to execute the instruction corresponding to the keyword or to send the instruction corresponding to the keyword is determined based on the disclosure in the above embodiments. The moment of stopping recognizing whether the voice signal includes the keyword as shown in FIG. 11 is only an exemplary illustration. Whether the voice signal is from the target user is determined. In response to the voice signal being from the non-target user, the keyword recognition is stopped.

In this embodiment, the keyword recognition may be stopped before or during recognizing whether the voice signal includes the keyword using the m-th algorithm. For example, in response to determining that the voice signal is from the non-target user and the operation of determining whether the voice signal is from the target user taking a short time, a feedback of stopping the keyword recognition may be received during recognizing whether the voice signal includes the keyword using the first algorithm. Therefore, the keyword recognition may be stopped during recognizing whether the voice signal includes the keyword using the first algorithm. In response to determining that the voice signal is from the non-target user and the operation of determining whether the voice signal is from the target user taking a long time, the feedback of stopping the keyword recognition may be received before or during recognizing whether the voice signal includes the keyword using the 2nd, 3rd . . . M-th algorithm. Therefore, the keyword recognition may be stopped before or during recognizing whether the voice signal includes the keyword using the 2nd, 3rd . . . M-th algorithm. In addition, the user may also set to stop the keyword recognition before or during the recognition using the 2nd, 3rd . . . M-th algorithm, until it is determined that the voice signal is from the target user, and then the keyword recognition continues. This embodiment does not limit the specific algorithm for recognizing the keyword, and may be implemented based on deep learning algorithms such as a convolutional neural network.

Based on the disclosure in the above embodiments, in this embodiment, before recognizing whether the voice signal includes the keyword or before determining whether the voice signal is from the target user, the method further includes the following operations.

In operation 032, the voice signal is collected.

In operation 033, the collected voice signal is cached.

Figure 14:
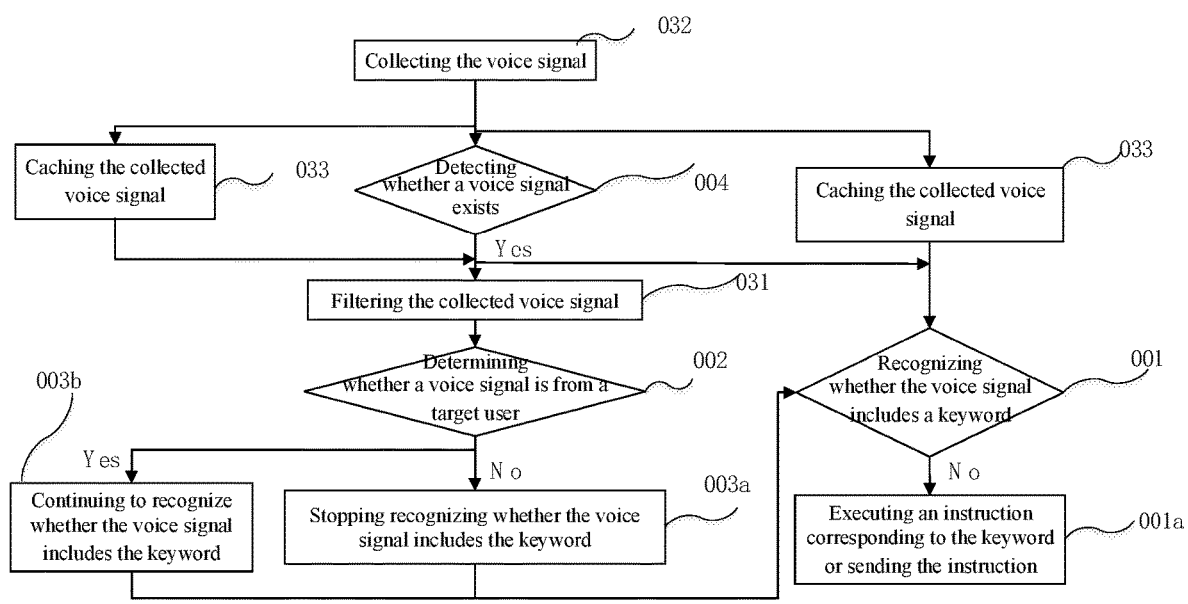
FIG. 14 is a flowchart of yet another voice control method according to an embodiment of the present disclosure.
Figure 15:
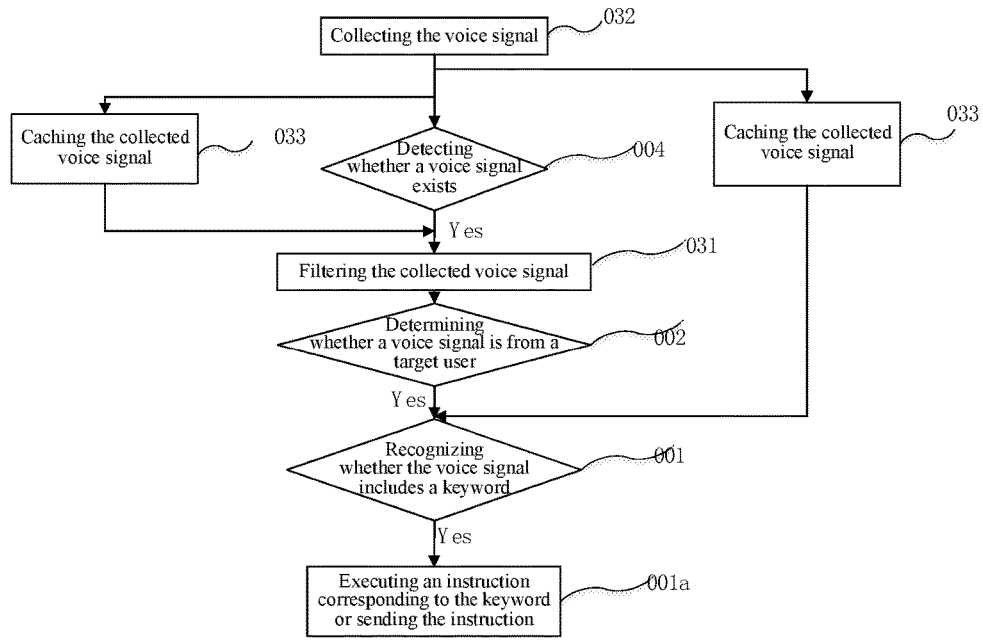
FIG. 15 is a flowchart of yet another voice control method according to an embodiment of the present disclosure.

Before operation 001, the method further includes operations 032 and 033. Before the keyword recognition or before determining whether the voice is from the target user, the voice signal may be cached to facilitate later-stage processing. The keyword recognition requires complete data packets. Caching the voice signal before the keyword recognition may ensure the integrity of the data packet content. Referring to FIGS. 14 and 15, before the keyword recognition or before determining whether the voice is from the target user, the collected voice signal may be cached. In response to collecting the voice signals using different devices, the voice signals may be cached separately, so as to align the generation time of a voice signal collected by the vibration sensor and a voice signal collected by the microphone. In response to collecting the voice signals using only one device, it is not necessary to separately cache the voice signals. In FIG. 15, the voice signal collected by the microphone is used for the keyword recognition, and the voice signal collected by the vibration sensor is used to determine whether the voice signal is from the target user. In operation 033 on the right side of FIG. 15, a caching time length of the cached voice signal collected by the microphone may be greater than or equal to the sum of a time length required for detecting whether the voice signal exists, a filtering time length and a time length for determining whether the voice signal is from the target user, so that the signal collected by the microphone is used for the keyword recognition only after it is determined that the voice signal is from the target user.

Based on the disclosure in the above embodiments, in this embodiment, collection of the voice signals may include the following two ways, and one or both of the two ways may be selected. The first way is operation 0321 of using the vibration sensor to collect the signal voice. The vibration sensor may be an acceleration sensor, or a vibration detection may also be realized by capacitance, optics, ultrasonic and other means. For example, the voice signal may be collected through the bone conduction path. This collection method is suitable for wearable devices such as earphones, necklaces, helmets, smart glasses, etc., which would physically contact with the skull by wearing. The second way is operation 0322 of using the microphone to collect the signal voice. This method is suitable for wearable devices or non-wearable devices. These two types of voice signal collection methods may also exist in a same device. For example, referring to FIGS. 16 and 17, the voice signal collected in operation 0322 is used for the keyword recognition, and the voice signal collected in operation 0321 is used to determine whether the voice is from the target user. The vibration sensor may detect whether a vocal cord of the target user vibrates through a bone conduction, so as to determine whether the voice is from the target user. When collecting the voice signal using the vibration sensor, the voice signal collected by the vibration sensor may be used to determine whether the voice signal is from the target user, and it may be not required to use the voice signal collected by the microphone to determine whether the voice signal is from the target user. Determining whether the voice signal is from the target users using the vibration sensor is relatively fast in speed and short in time consumption, while when using the voice signal collected by the microphone to determine whether the voice signal is from the target user, a voiceprint is required to be extracted and recognized, which takes a relatively long time. Therefore, the voice signal collected by the vibration sensor may be used to determine whether the voice signal is from the target user, and the voice signal collected by the microphones may be used to determine whether the voice signal include the keyword.

When using one collection method of the voice signal, and when only the microphone is used to collect the voice signal, the voice signal collected by the microphone may be used for the keyword recognition, and the voice signal collected by the microphone may also be used to determine whether the voice signal is from the target user. The voice signal collected by the microphone may also be used in the subsequent operations which require the voice signal. When only the vibration sensor is used to collect the voice signal, the voice signal collected by the vibration sensor may be used for the keyword recognition, and the voice signal collected by the vibration sensor may also be used to determine whether the voice signal is from the target user. The voice signal collected by the vibration sensor may also be used in the subsequent operations which require the voice signal.

When the pronunciation of a certain syllable (such as a voiced consonant or a vowel) can obviously causing the vibration of the vocal cord, the vibration sensor is more sensitive to these syllables which easily cause the vibration of the vocal cord, and these syllables are easier to be detected by the vibration sensor. In response to the keyword being the syllables which easily cause the vibration of the vocal cord, such as a voiced consonant or a vowel, the vibration sensor may be selected to collect the voice signal, and the voice signal may be used to determine whether the voice signal is from the target user. In addition, the voice signal collected by the vibration sensor may also be used for the keyword recognize of the syllable.

Based on the disclosure in the above embodiments, in this embodiment, determining whether the voice signal is from the target user includes the following two methods. A first method is to determine that the voice signal is from the target user in response to an energy of the voice signal collected by the vibration sensor exceeding a threshold energy. When the vibration sensor adopts a triaxial acceleration sensor and uses multiple axis data, weighting and correlation operations may be executed on the multiple axis data, so as to more accurately determine whether the voice signal is from the target user. This method is suitable for an electronic device that uses the vibration sensor to collect the voice signal. A second method is to determine that the voice signal is from the target user in response to the voice signal collected by the microphone meeting a preset condition of a voiceprint recognition. This method is suitable for electronic equipment that uses the microphone to collect voice signal.

Figure 12:
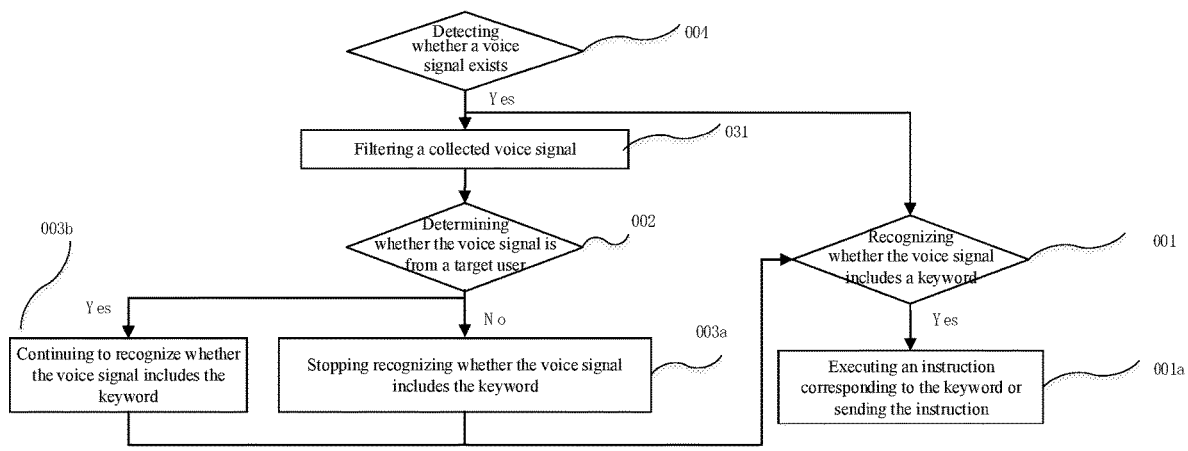
FIG. 12 is a flowchart of yet another voice control method according to an embodiment of the present disclosure.
Figure 13:
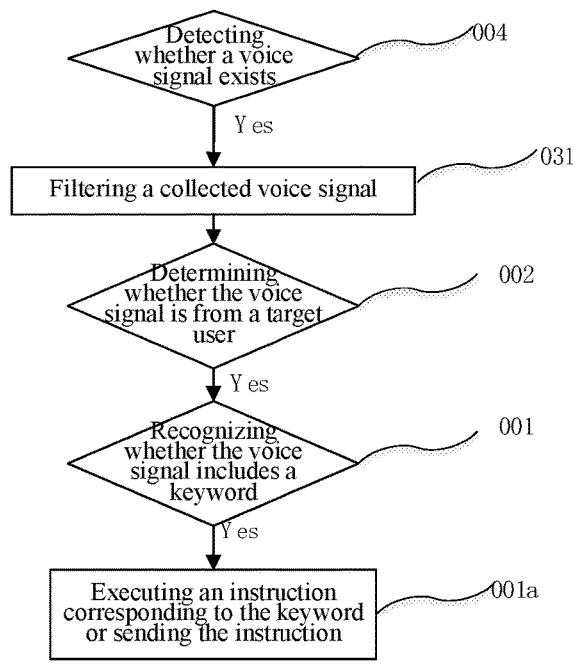
FIG. 13 is a flowchart of yet another voice control method according to an embodiment of the present disclosure.

Based on the disclosure in the above embodiments, in this embodiment, referring to FIGS. 12 and 13, before determining whether the voice signal is from the target user, operation 031 of filtering the collected voice signal is executed. In this way, the accuracy of determining whether the voice signal is from the target user can be improved. When the voice signal is collected by the vibration sensor, a filtering operation may filter out the interference caused by the actions of the target user, such as low-frequency interference resulting from walking and running. A filter may be used to filter the collected voice signal. For example, for noise signals in different frequency bands, one or more types of filters such as a high-pass filter, low-pass filter or band-pass filter may be selected, and the types of filters are not limited in this embodiment.

Figure 16:
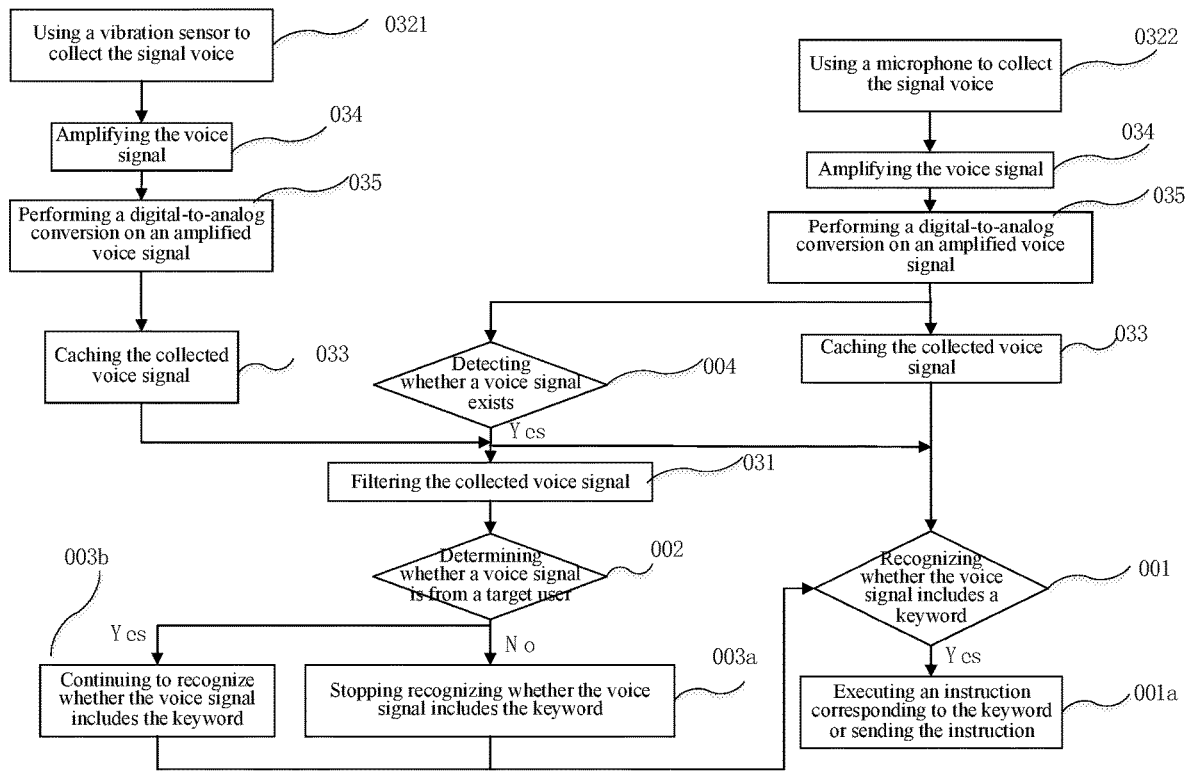
FIG. 16 is a flowchart of yet another voice control method according to an embodiment of the present disclosure.
Figure 17:
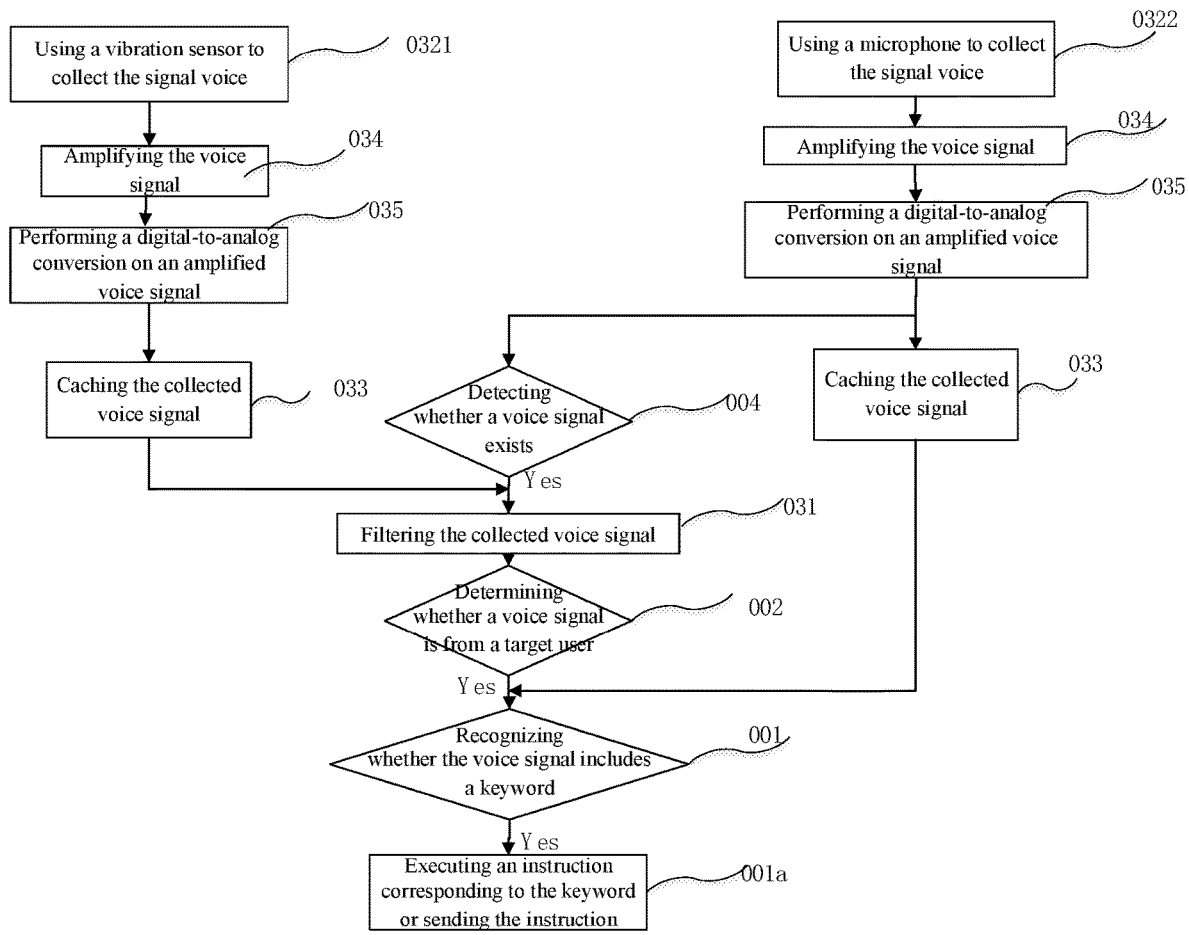
FIG. 17 is a flowchart of yet another voice control method according to an embodiment of the present disclosure.

Based on the disclosure in the above embodiments, in this embodiment, whether the voice signal exists is detected when caching the voice signal. In response to the voice signal existing, whether the voice signal is from the target user is determined. Referring to FIGS. 14 and 15, whether the voice signal exists is detected when caching the voice signal, which can save processing time. After a frame of voice signal is cached, whether the voice signal includes the keyword is recognized. In this embodiment, only after detecting that the voice signal exists, determination of whether the voice signal is from the target user is started. In addition, referring to FIGS. 16 and 17, after the voice signal is collected, operation 034 of amplifying the voice signal and operation 035 of performing a digital-to-analog conversion on an amplified voice signal may be executed. In FIG. 16 and FIG. 17, examples of amplification and digital-to-analog conversion of the collected voice signal are respectively illustrated. If there is only one collection method of voice signal in the electronic device, only one time of amplification and one time of digital-to-analog conversion are required. In this embodiment, an amplifier and a digital-to-analog converter may be integrated in the microphone or arranged outside the microphone, which is not limited in this embodiment. In addition, the analog-to-digital converter may be used to perform the analog-to-digital conversion, and a cache may be used to perform the caching. In this embodiment, the cache, the analog-to-digital converter and the filter are integrated into a chip, such as a voice processing chip, or the cache, the analog-to-digital converter and the filter may individually be integrated into a same or different other chips, which is not limited in this embodiment.

In this embodiment, a wearing detection may be executed before collecting the voice signal. In response to a wearing state being detected, the voice signal is collected. Whether to execute the instruction corresponding to the keyword or to send the instruction corresponding to the keyword is determined according to the voice control method provided in the above embodiments. Adding a wearing detection module can further reduce the power consumption. Only in response to the wearable device being in the wearing state, whether to execute the instruction corresponding to the keyword or to send the instruction corresponding to the keyword is determined. In addition, multiple microphones may be used. A microphone collects the voice signal, and a microphone collects environmental noise for noise reduction processing. A voice noise reduction module may be added, which can improve the accuracy of the keyword recognition, accuracy of detecting whether the voice signal exists and accuracy of whether the voice signal is from the target user, so as to improve the performance of the voice control method.

Based on the disclosure in the above embodiments, in this embodiment, the instruction corresponding to the keyword include one or more of waking up a voice assistant, adjusting a volume, adjusting a brightness, lighting up a screen, making a telephone call and playing music, etc. The instruction in this embodiment may be set according to the user's requirements. For example, the user may set the keyword to be "turn up the volume", which corresponds to an instruction of increasing the volume. In response to the voice signal including "turn up the volume", the instruction of increasing the volume is executed. In addition, the user may set the keyword to be "turn up the brightness and make a telephone call", which corresponds to two instructions. In response to the voice signal including "turn up the brightness and make a telephone call", the screen brightness is increased and a dialing interface is activated. In this embodiment, the instruction corresponding to the keyword may be set by the user according to the keyword, and is not limited to the above instructions mentioned in this embodiment.

Figure 18:
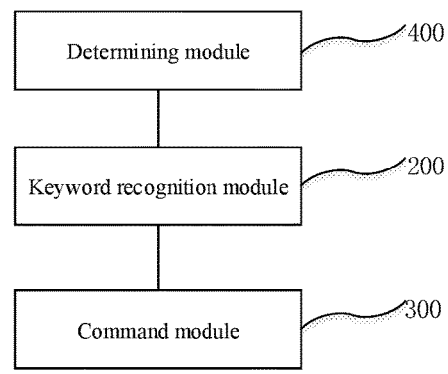
FIG. 18 is a schematic structural diagram of a voice control apparatus according to an embodiment of the present disclosure.
Figure 19:
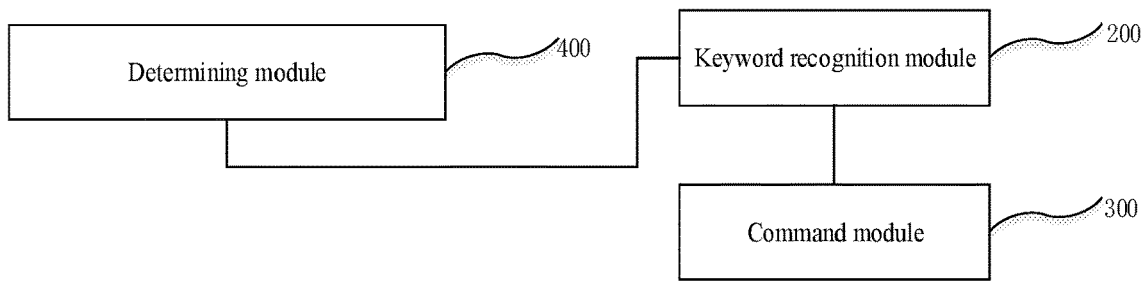
FIG. 19 is a schematic structural diagram of another voice control apparatus according to an embodiment of the present disclosure.

An embodiment of the present disclosure provides a voice control apparatus, configured to execute a voice control method provided in the forgoing embodiments. FIGS. 18 and 19 are schematic structural diagrams of the voice control apparatus provided in this embodiment, and the apparatus may implement the above-mentioned methods as shown in FIGS. 1 to 17. As shown in FIGS. 18 and 19, the voice control apparatus 100 includes:

a keyword recognition module 200, configured to recognize whether a voice signal includes a keyword;

a command module 300, connected with the keyword recognition module 200, and configured to execute an instruction corresponding to the keyword or send the instruction in response to the keyword recognition module 200 recognizing that the voice signal includes the keyword;

a determining module 400, connected with the keyword recognition module 200 and configured to determine whether the voice signal is from a target user before the keyword recognition module 200 recognizes whether the voice signal includes the keyword, and in response to the determining module determining that the voice signal is from the target user, the keyword recognition module 200 starting to recognize whether the voice signal includes the keyword; or configured to determine whether the voice signal is from the target user during the keyword recognition module 200 recognizing whether the voice signal includes the keyword, and in response to the determining module determining that the voice signal is from a non-target user, the keyword recognition module 200 stopping recognizing whether the voice signal includes the keyword.

Optionally, before the keyword recognition module recognizes whether the voice signal includes the keyword, the determining module is configured to determine whether the voice signal is from the target user. In response to the determining module determining that the voice signal is from the non-target user, the determining module is configured to determine whether a next frame of voice signal is from the target user.

Optionally, during the keyword recognition module recognizing whether the voice signal includes the keyword, the determining module is configured to determine whether the voice signal is from the target user. In response to the determining module determining that the voice signal is from the target user, the keyword recognition module continues to recognize whether the voice signal includes the keyword.

Optionally, the apparatus further includes a voice activity detection module configured to detect whether the voice signal exists before the determining module determines whether the voice signal is from the target user. In response to the voice activity detection module detecting that the voice signal exists, the determining module determines whether the voice signal is from the target user.

Optionally, before the determining module determines whether the voice signal is from the target user during the keyword recognition module recognizing whether the voice signal includes the keyword the voice activity detection module detects whether the voice signal exists before the keyword recognition module starts to recognize whether the voice signal includes the keyword; and in response to the voice activity detection module detecting that the voice signal exists, the keyword recognition module starts to recognize whether the voice signal includes the keyword.

Optionally, the keyword includes N syllables, the N is an integer greater than or equal to 2. The keyword recognition module includes:
a syllable recognition module, configured to sequentially recognize whether the voice signal includes the N syllables according to a preset syllable order;
after recognizing that the voice signal includes a n-th syllable in the preset syllable order, the syllable recognition module recognizes whether the voice signal includes a (n+1)-th syllable in the preset syllable order, until recognition of the N syllables is completed, where the n is an integer greater than 0 and less than the N.

Optionally, the keyword recognition module stops recognizing whether the voice signal includes the keyword before the syllable recognition module recognizes whether the voice signal includes the (n+1)-th syllable; or
the keyword recognition module stops recognizing whether the voice signal includes the keyword during the syllable recognition module recognizing whether the voice signal includes the n-th syllable.

Optionally, the keyword recognition module includes:
a hierarchical recognition module, configured to perform m-th recognition of whether the voice signal includes the keyword using a m-th algorithm;
after recognizing that the voice signal includes the keyword using the m-th algorithm, the hierarchical recognition module recognizes whether the voice signal includes the keyword using a (m+1)-th algorithm, until recognition of whether the voice signal includes the keyword is performed for M times; the M is an integer greater than or equal to 2, a complexity of the m-th algorithm increases with an increase of m, the m is an integer greater than 0 and smaller than the M.

Optionally, the keyword recognition module stops recognizing whether the voice signal includes the keyword before the hierarchical recognition module recognizes whether the voice signal includes the keyword using the (m+1)-th algorithm; or
the keyword recognition module stops recognizing whether the voice signal includes the keyword during the hierarchical recognition module recognizing whether the voice signal includes the keyword using the m-th algorithm.

Optionally, the apparatus further includes:
a collecting module, configured to collect the voice signal; and
a cache module, configured to cache the collected voice signal before the keyword recognition module recognizes whether the voice signal includes the keyword or before the determining module determines whether the voice signal is from the target user.

Optionally, the collecting module includes one or both of a vibration sensor module and a microphone module;
the vibration sensor module is configured to collect the voice signal using a vibration sensor; and the microphone module is configured to collect the voice signal using a microphone.

Optionally, the determining module includes:
an energy determining module, configured to determine that the voice signal is from the target user in response to an energy of the voice signal collected by the vibration sensor module exceeding a threshold energy; or
a voiceprint recognition module, configured to determine that that voice signal is from the target user in response to the voice signal collected by the microphone module meeting a preset condition of voiceprint recognition.

Optionally, the apparatus further includes a filtering module configured to filter the voice signal collected by the collecting module before the determining module determines whether the voice signal is from the target user.

Optionally, when the cache module caches the voice signal, the voice activity detection module detects whether the voice signal exists. In response to the voice activity detection module detecting that the voice signal exists, the determining module starts to determine whether the voice signal is from the target user.

Optionally, the command module includes one or more of a voice wake-up module, a volume adjustment module, a brightness adjustment module, a screen lighting-up module, a telephone call module and music module. The voice wake-up module is configured to wake up a voice assistant. The volume adjustment module is configured to adjust a volume. The brightness adjustment module is configured to adjust a brightness. The screen lighting-up module is configured to light up a screen. The telephone call module is configured to make a telephone call. The music module is configured to play music.

An embodiment of the present disclosure provides a voice control apparatus. With the voice control apparatus, the power consumption of the voice control can be reduced and the endurance can be improved by: determining whether the voice signal is from the target user before starting to recognize whether the voice signal includes the keyword, or determining whether the voice signal is from the target user during recognition of whether the voice signal includes the keyword, and in response to the voice signal being from the non-target user, recognition of whether the voice signal includes the keyword is stopped.

Figure 20:
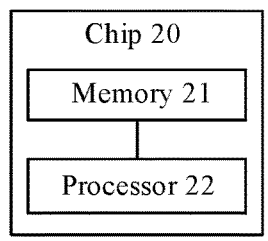
FIG. 20 is a schematic structural diagram of a chip according to an embodiment of the present disclosure.

An embodiment of the present disclosure further provides a chip configured to execute the voice control method provided by the embodiments. In this embodiment, as shown in FIG. 20, the chip 20 may include a memory 21 and a processor 22;
the memory 21 is coupled to the processor 22;
the memory 21 is configured to store program instructions; and
the processor 22 is configured to call the program instructions stored in the memory, to enable the chip to execute the voice control method.

The chip provided by the embodiment of the present disclosure can execute the voice control method provided by any one of the above embodiments. The specific implementation process and beneficial effects may be referred to above, which are not repeated here.

An embodiment of the present disclosure further provides an earphone, which includes the chip provided in the forgoing embodiment. The specific implementation process and beneficial effects may be referred to above, which are not repeated here.

Figure 21:
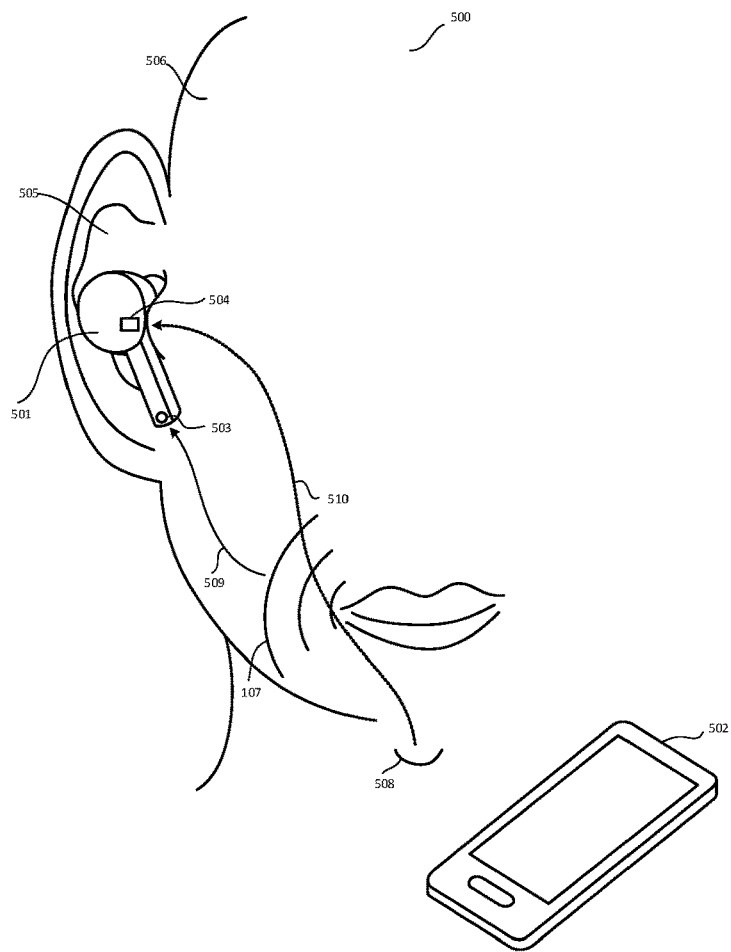
FIG. 21 is a schematic structural diagram of a voice control system according to an embodiment of the present disclosure.

An embodiment of the present disclosure further provides a voice control system for executing the voice control method provided by any one of the above embodiments. A voice control system 500 shown in FIG. 21 is taken as an example to illustrate. 501 is an earphone with a microphone 503 and a vibration sensor 504. The positions of the microphone and the vibration sensor in the drawing are only exemplary and the microphone and the vibration sensor may also be arranged in other positions. The earphone 501 is worn in a concha cavity 505, and the earphone is in physical contact with a skull 506. In response to a target user speaking, a voice signal of the target user is collected by the microphone 503 through an air transmission path 509. At the same time, a vibration of a vocal cord 508 may be transmitted to the vibration sensor 504 through the skull 506 and a bone conduction path 510. A keyword recognition algorithm may be used to determine whether a voice signal collected by the microphone 503 includes a keyword, and a voice signal collected by the vibration sensor 503 may be used to determine whether the voice signal is provided by the target user. After determining that the target user speaks the keyword, the earphone 501 transmits an instruction corresponding to the keyword to a mobile phone 502, and the mobile phone 502 enters a instruction execution mode. In this embodiment, the voice signal collected by the vibration sensor 503 may be transmitted to the mobile phone, and an operation of determining whether the keyword is spoken by the target user may be performed by the mobile phone, or whether the voice signal collected by the microphone 503 includes the keyword may be determined by the earphone, which is not limited in this embodiment.

The voice control system in FIG. 21 is only an exemplary illustration. The specific implementation process and beneficial effects may be referred to above, which are not repeated here. In this embodiment, two terminals, the earphone and the mobile phone, are taken as examples for illustration. The system may also include other terminals, such as a smart speaker, a tablet or a computer, etc. The data communication modes between the earphone and the terminal include but are not limited to wireless transmission modes such as Bluetooth, Wi-Fi, long term evolution (LTE), near field communication (NFC), narrow band Internet of things (NB-IoT) as well as wired transmission modes such as USB, Type C interface, and 3.5 mm audio interface.

It should be noted that the above method embodiments of the present disclosure may be applied to or implemented by a processor. The processor may be an integrated circuit chip with signal processing capabilities. In an implementation process, each operation of the above method embodiments may be completed by an integrated logic circuit of hardware in the processor or an instruction in the form of software. The above processor may be a general purpose processor, a digital signal processor (DSP), an application specific integrated circuit (ASIC), a field programmable gate array (FPGA) or other programmable logic devices, a discrete gate or transistor logic device, and a discrete hardware component. The methods, operations and logic block diagrams disclosed in the embodiments of the present disclosure may be implemented or executed. The general purpose processor may be a microprocessor or the processor may be any conventional processor or the like. The operations of the methods disclosed in conjunction with the embodiments of the present disclosure may be directly embodied in the completion of execution by a hardware decoding processor, or the completion of execution by a combination of hardware and software modules in the decoding processor. The software module may be located in a random access memory, a flash memory, a read-only memory, a programmable read-only memory, or an electrically erasable programmable memory, a register and other mature storage media in the art. The storage medium is located in a memory. The processor reads the information in the memory and completes the operations of the above methods by combining the hardware.

It can be understood that the memory in the embodiments of the present disclosure may be a volatile memory or a nonvolatile memory, or may include both the volatile memory and the nonvolatile memory. The nonvolatile memory may be the read-only memory (ROM), the programmable ROM (PROM), an erasable PROM (EPROM), an electrically EPROM (EEPROM) or the flash memory. The volatile memory may be a random access memory (RAM), which is used as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memories of the system and methods described herein are intended to include, but are not limited to, these and any other suitable types of memories.

It should be understood that in the embodiments of the present disclosure, "B corresponding to A" means that B is associated with A, and B may be determined according to A. However, it should further be understood that determining B according to A does not mean determining B only according to A, but also according to A and/or other information.

In addition, the term "and/or" in this specification is only an association relationship to describe associated objects, which indicates that there may be three kinds of relationships. For example, A and/or B may mean that there are three situations: an existence of A alone, an existence of both A and B, and an existence of B alone. In addition, the character "/" in this specification generally indicates that the front and rear associated objects are in an "or" relationship.

Those having ordinary skills in the art may realize that the units and algorithm operations of each example described in conjunction with the embodiments disclosed herein may be implemented by an electronic hardware or a combination of computer software and the electronic hardware. Whether these functions are executed in hardware or software depends on the specific application and design constraints of the technical solution. Skilled technicians may realize the described functions for each specific application by using different methods, but such realization should not be considered beyond the scope of the present disclosure.

Those skilled in the art may clearly understand that for the convenience and conciseness of description, the specific working processes of the above-described system, apparatus and units may refer to the corresponding processes in the forgoing method embodiments, which are not repeated here.

In the several embodiments provided by the present disclosure, it should be understood that the disclosed system, apparatus and method may be implemented in other ways. For example, the apparatus embodiments described above are only illustrative. For example, the division of the units is only a logical function division, and there may be other division methods in actual implementation. For example, multiple units or components may be combined or integrated into another system, or some features may be ignored or not implemented. On the other hand, the mutual coupling or direct coupling or communication connection shown or discussed may be indirect coupling or communication connection through some interfaces, apparatuses or units, and may be in electrical, mechanical or other forms.

The units described as separate components may or may not be physically separated, and the components displayed as units may or may not be physical units, that is, the components may be located in one place or distributed to multiple network units. Some or all units may be selected according to actual needs to achieve the purpose of the solutions in the embodiments.

In addition, each functional unit in each embodiment of the present disclosure may be integrated in one processing unit, or each unit may physically exist separately, or two or more units may be integrated in one unit.

The functions, in response to being implemented in the form of software functional units and sold or used as independent products, may be stored in a computer-readable storage medium. Based on such understanding, the technical solution of the present disclosure in essence, or a part that contributes to the existing technology or a part of the technical solution may be embodied in the form of a software product. The computer software product is stored in a storage medium and includes several instructions to cause a computer device (which may be a personal computer, a server, a network device, etc.) to execute all or part of the operations of the methods described in various embodiments of the present disclosure. The aforementioned storage medium includes a U disk, a removable hard disk, a read-only memory (ROM), a random access memory (RAM), a magnetic disk or an optical disk and other media that may store program codes.

The above are only the specific implementations of the present disclosure, but the protection scope of the present disclosure is not limited to these. Any person skilled in the art may easily conceive of changes or substitutions within the technical scope disclosed in the present disclosure, which shall fall within the protection scope of the present disclosure. Therefore, the protection scope of the present disclosure shall be subject to the protection scope defined by the claims.

What is claimed is:

1. A voice control method, comprising:
    recognizing whether a voice signal comprises a keyword;
    in response to the voice signal comprising the keyword, executing an instruction corresponding to the keyword or sending the instruction;
    determining whether the voice signal is from a target user before recognizing whether the voice signal comprises the keyword, and in response to the voice signal being from the target user, starting to recognize whether the voice signal comprises the keyword; or
    determining whether the voice signal is from the target user during recognizing whether the voice signal comprises the keyword;
    wherein recognizing whether the voice signal comprises the keyword comprises:
        recognizing whether the voice signal comprises the keyword using a m-th algorithm; and
        after recognizing that the voice signal comprises the keyword using the m-th algorithm, recognizing whether the voice signal comprises the keyword using a (m+1)-th algorithm, until recognition of whether the voice signal comprises the keyword is performed for M times, wherein M is an integer greater than or equal to 2, and m is an integer greater than 0 and smaller than M.

2. The voice control method according to claim 1, further comprising: determining whether the voice signal is from the target user before recognizing whether the voice signal comprises the keyword, and in response to the voice signal being from a non-target user, determining whether a next frame of voice signal is from the target user.

3. The voice control method according to claim 1, determining whether the voice signal is from the target user during recognizing whether the voice signal comprises the keyword, and in response to the voice signal being from a non-target user, stopping recognizing whether the voice signal comprises the keyword.

4. The voice control method according to claim 1, before determining whether the voice signal is from the target user, the method further comprises detecting whether the voice signal exists, and in response to detecting that the voice signal exists, determining whether the voice signal is from the target user.

5. The voice control method according to claim 4, further comprising:
    before determining whether the voice signal is from the target user during recognizing whether the voice signal comprises the keyword, detecting, before starting to recognize whether the voice signal comprises the keyword, whether the voice signal exists; and
    in response to the voice signal existing, starting to recognize whether the voice signal comprises the keyword.

6. The voice control method according to claim 1, wherein the keyword comprises N syllables, the N is an integer greater than or equal to 2; and
recognizing whether the voice signal comprises the keyword comprises:
    recognizing sequentially whether the voice signal comprises the N syllables according to a preset syllable order;
    recognizing whether the voice signal comprises a (n+1)-th syllable in the preset syllable order after recognizing that the voice signal comprises a n-th syllable in the preset syllable order, until recognition of the N syllables is completed, wherein the n is an integer greater than 0 and less than the N.

7. The voice control method according to claim 6, further comprising:
    determining whether the voice signal is from the target user during recognizing whether the voice signal comprises the keyword, and in response to the voice signal being from a non-target user, stopping recognizing whether the voice signal comprises the keyword, wherein stopping recognizing whether the voice signal comprises the keyword comprises:
    stopping recognizing whether the voice signal comprises the keyword before recognizing whether the voice signal comprises the (n+1)-th syllable; or
    stopping recognizing whether the voice signal comprises the keyword during recognizing whether the voice signal comprises the n-th syllable.

8. The voice control method according to claim 1, wherein a complexity of the m-th algorithm increases with an increase of m.

9. The voice control method according to claim 8, further comprising:
    determining whether the voice signal is from the target user during recognizing whether the voice signal comprises the keyword, and in response to the voice signal being from a non-target user, stopping recognizing whether the voice signal comprises the keyword, wherein stopping recognizing whether the voice signal comprises the keyword comprises:
    stopping recognizing whether the voice signal comprises the keyword before recognizing whether the voice signal comprises the keyword using the (m+1)-th algorithm; or
    stopping recognizing whether the voice signal comprises the keyword during recognizing whether the voice signal comprises the keyword using the m-th algorithm.

10. The voice control method according to claim 1, wherein before recognizing whether the voice signal comprises the keyword or before determining whether the voice signal is from the target user, the method further comprises:
    collecting the voice signal;
    caching collected voice signal; and
    detecting whether the voice signal exists while caching the collected voice signal, and in response to the voice signal existing, starting to determine whether the voice signal is from the target user.

11. A chip, configured to execute the voice control method according to claim 1.

12. A voice control apparatus, comprising:
a processor; and
a memory configured to store instructions executable by the processor;
wherein the processor is configured to execute the instructions to:
recognize whether a voice signal comprises a keyword;
execute an instruction corresponding to the keyword or send the instruction in response to recognizing that the voice signal comprises the keyword;
determine whether the voice signal is from a target user before the keyword recognition module recognizes whether the voice signal comprises the keyword, and in response to determining that the voice signal is from the target user, start to recognize whether the voice signal comprises the keyword; or
determine whether the voice signal is from the target user during the keyword recognition module recognizing whether the voice signal comprises the keyword;
wherein recognizing whether the voice signal comprises the keyword comprises:
recognizing whether the voice signal comprises the keyword using a m-th algorithm; and
after recognizing that the voice signal comprises the keyword using the m-th algorithm, recognizing whether the voice signal comprises the keyword using a (m+1)-th algorithm, until recognition of whether the voice signal comprises the keyword is performed for M times, wherein M is an integer greater than or equal to 2, and m is an integer greater than 0 and smaller than M.

13. The voice control apparatus according to claim 12, wherein the processor is further configured to: determine whether the voice signal is from the target user before recognizing whether the voice signal comprises the keyword, and in response to determining that the voice signal is from a non-target user, determine whether a next frame of voice signal is from the target user.

14. The voice control apparatus according to claim 12, wherein the processor is configured to determine whether the voice signal is from the target user during recognizing whether the voice signal comprises the keyword, and in response to determining that the voice signal is from a non-target user, stop recognizing whether the voice signal comprises the keyword.

15. The voice control apparatus according to claim 12, wherein the processor is further configured to:
detect whether the voice signal exists before determining whether the voice signal is from the target user, and in response to detecting that the voice signal exists, determine whether the voice signal is from the target user.

16. The voice control apparatus according to claim 15, wherein before determining whether the voice signal is from the target user during recognizing whether the voice signal comprises the keyword, the processor is further configured to detect whether the voice signal exists before starting to recognize whether the voice signal comprises the keyword; and
in response to detecting that the voice signal exists, start to recognize whether the voice signal comprises the keyword.

17. The voice control apparatus according to claim 12, wherein the keyword comprises N syllables, the N is an integer greater than or equal to 2; and the processor is further configured to:
sequentially recognize whether the voice signal comprises the N syllables according to a preset syllable order;
after recognizing that the voice signal comprises a n-th syllable in the preset syllable order, recognize whether the voice signal comprises a (n+1)-th syllable in the preset syllable order, until recognition of the N syllables is completed, wherein the n is an integer greater than 0 and less than the N.

18. The voice control apparatus according to claim 17, wherein the processor is further configured to:
determine whether the voice signal is from the target user during recognizing whether the voice signal comprises the keyword, and in response to the voice signal being from a non-target user, stop recognizing whether the voice signal comprises the keyword, wherein stopping recognizing whether the voice signal comprises the keyword comprises:
stopping recognizing whether the voice signal comprises the keyword before recognizing whether the voice signal comprises the (n+1)-th syllable; or
stopping recognizing whether the voice signal comprises the keyword during recognizing whether the voice signal comprises the n-th syllable.

19. The voice control apparatus according to claim 12, wherein a complexity of the m-th algorithm increases with an increase of m.

20. The voice control apparatus according to claim 19, wherein the processor is further configured to:
determine whether the voice signal is from the target user during recognizing whether the voice signal comprises the keyword, and in response to the voice signal being from a non-target user, stop recognizing whether the voice signal comprises the keyword, wherein stopping recognizing whether the voice signal comprises the keyword comprises:
stopping recognizing whether the voice signal comprises the keyword before recognizing whether the voice signal comprises the keyword using the (m+1)-th algorithm; or stopping recognizing whether the voice signal comprises the keyword during recognizing whether the voice signal comprises the keyword using the m-th algorithm.

* * * * *